(12) United States Patent
Funayama et al.

(10) Patent No.: US 9,002,055 B2
(45) Date of Patent: Apr. 7, 2015

(54) METHODS AND SYSTEMS FOR MATCHING KEYPOINTS AND TRACKING REGIONS BETWEEN FRAMES OF VIDEO DATA

(75) Inventors: Ryuji Funayama, Kanagawa (JP); Hiromichi Yanagihara, Musashino (JP); Julien Fauqueur, London (GB); Gabriel Brostow, London (GB); Roberto Cipolla, Cambridge (GB)

(73) Assignees: Toyota Motor Europe NV, Brussels (BE); Cambridge Enterprise Limited, Cambridge (GB)

(*) Notice: Subject to any disclaimer, the term of this patent is extended or adjusted under 35 U.S.C. 154(b) by 896 days.

(21) Appl. No.: 12/682,425

(22) PCT Filed: Oct. 13, 2008

(86) PCT No.: PCT/EP2008/063741
§ 371 (c)(1),
(2), (4) Date: Apr. 9, 2010

(87) PCT Pub. No.: WO2009/047366
PCT Pub. Date: Apr. 16, 2009

(65) Prior Publication Data
US 2010/0239123 A1 Sep. 23, 2010

(30) Foreign Application Priority Data

Oct. 12, 2007 (EP) .................................... 07447058
Oct. 13, 2007 (EP) .................................... 07447059

(51) Int. Cl.
*G06K 9/00* (2006.01)
*G06K 9/34* (2006.01)
(Continued)

(52) U.S. Cl.
CPC ............. *G06T 7/0081* (2013.01); *G06T 7/0097* (2013.01); *G06T 7/2046* (2013.01); *G06T 2207/10016* (2013.01); *G06T 2207/30232* (2013.01)

(58) Field of Classification Search
None
See application file for complete search history.

(56) References Cited

U.S. PATENT DOCUMENTS

2004/0125210 A1* 7/2004 Chen .......................... 348/207.99
2008/0284791 A1* 11/2008 Bressan et al. ................ 345/589

FOREIGN PATENT DOCUMENTS

JP         9161071 A      6/1997
JP         10164594 A  *  6/1998  .............. H04N 7/32
JP         200672491 A    3/2006

OTHER PUBLICATIONS

Ulmer, Berthold "VITA II—Active Collision Avoidance in Real Traffic," Proceedings of the Intelligent Vehicles '94 Symposium, Oct. 26, 1994, 7 pages.*

(Continued)

*Primary Examiner* — Atiba O Fitzpatrick
*Assistant Examiner* — Ryan P Potts
(74) *Attorney, Agent, or Firm* — Bacon & Thomas, PLLC

(57) ABSTRACT

A method (100) and system (300) is described for processing video data comprising a plurality of images. The method (100) comprising obtaining (104, 106), for each of the plurality of images, a segmentation in a plurality of regions and a set of keypoints, and tracking (108) at least one region between a first image and a subsequent image resulting in a matched region in the subsequent image taking into account a matching between keypoints in the first image and the subsequent image. The latter results in accurate tracking of regions. Furthermore the method may optionally also perform label propagation taking into account keypoint tracking.

17 Claims, 8 Drawing Sheets

(51) Int. Cl.
*G06K 9/66* (2006.01)
*G06K 9/56* (2006.01)
*G06T 7/00* (2006.01)
*G06T 7/20* (2006.01)

(56) References Cited

OTHER PUBLICATIONS

Lepetit, Vincent et al. "Keypoint Recognition Using Randomized Trees," IEEE Transactions on Pattern Analysis and Machine Intelligence, vol. 28, No. 9, Sep. 2006, 15 pages.*
Krishnamurthy, Ravi et al. "Frame Interpolation and Bidirectional Prediction of Video Using Compactly Encode Optical-Flow Fields and Label Fields," IEEE Transactions on Circuits and Systems for Video Technology, vol. 9, No. 5, Aug. 1999, 14 pages.*
International Search Report in PCT/EP2008/063741, Feb. 23, 2010.
Fauqueur et al.: "Assisted Video Object Labelling by Joint Tracking of Regions and Keypoints." In Proc. Int. Workshop on Interactive Computer Vision, Rio De Janeiro, Brazil, [Online] Oct. 14, 2007-Oct. 21, 2007 XP002475441.
Bertini et al.: "Automatic Annotation of Sport Video Content" Jan. 1, 2005, Progress in Pattern Recognition, Image Analysis and Applications: 10th Iberoamerican Congress on Pattern Recognition, CIARP 2005, Havana, Cuba, Nov. 15-18, 2005; Proceedings, Springer, Berlin, DE, pp. 1066-1078, XP019023553.
Wang et al.: "Automatice Moving Object Segmentation with Accurate Boundaries" Jan. 1, 2005, Computer Vision—ACCV 2006 Lecture Notes in Computer Science;; LNCS, Springer, Berlin, DE, pp. 276-285, XP019027355.
Garcia et al.: "Region-of-Interest Tracking Based on Keypoint Trajectories on a Group of Pictures", Content-Based Multimedia Indexing, 2007. CBMI '07. International Workshop on, IEEE, PI, Jun. 2007, pp. 198-2003, XP031118001.
Anjulan et al.: "Object based video retrieval with local region tracking", Signal Processing. Image Communication, Elsevier Science Publishers, Amsterdam, NL, vol. 22, No. 7-8, Aug. 2007, pp. 607-621, XP022207431.
Sivic et al.: "Object Level Grouping for Video Shots", Apr. 22, 2004, Computer Vision—ECCV 2004; [Lecture Notes in Computer Science;; LNCS], Springer-Verlag, Berlin/Heidelberg, pp. 85-98, XP019005860.
Patras et al.: "Semi-automatic object-based video segmentation with labeling of color segments", Signal Processing, Image Communication, Elsevier Science Publishers, Amsterdam, NL, vol. 18, No. 1, Jan. 1, 2003, pp. 51-65, XP004393725.
Yuji Tsuduki, Mean Shift-based Point Feature Tracking using SIFT, IPSJ SIG Technical Reports, Information Processing Society of Japan, Jan. 12, 2007, vol. 2007, No. 1, pp. 101-108. (See JPO Official Action Mar. 19, 2012).
Official Action of JPO in JP-2010-528432, Mar. 19, 2012 with English language Translation.
International Preliminary Report on Patentability and Written Opinion in PCT/EP2008/063741, Apr. 13, 2010.

* cited by examiner

METHODS AND SYSTEMS FOR MATCHING KEYPOINTS AND TRACKING REGIONS BETWEEN FRAMES OF VIDEO DATA

TECHNICAL FIELD OF THE INVENTION

The present invention relates to systems and methods for processing video data especially as applied to object recognition in video images. More particularly, the present invention relates to semi-automatic or automatic processing of video data such as for example tracking regions and/or propagating labels of objects therein, a corresponding processing system and the application of such processing.

BACKGROUND OF THE INVENTION

The identification of objects in video has different applications in Medical Imaging, Content Analysis, the Film Industry, transport and vehicle control. However, in order for objects to be identified, at least during training of the system, typically a human operator label them explicitly. Presently, even automatic object recognition algorithms require the production of hand-labelled visual data in order for them to be trained. The task of manual labelling objects is tedious, in particular for videos with a large number of individual images in a sequence of any length.

Label propagation is a very challenging problem because it requires tracking of object regions which lack "visual identity". Adjacent video images in a sequence often have a large noise level making label propagation inherently unstable. Different problems related to labelling and performing segmentation have been discussed in the literature and solutions for facilitating these task have been proposed. One example is the use of an interactive approach whereby a distinct foreground object is precisely extracted from its background. In this approach, the user is closely involved in the refinement of the segmentation of the images. A related problem to label propagation is the colourisation problem. With a few coloured strokes on a greyscale video image, the user specifies how to colourize it in a realistic manner. Whereas the use of colourization is widely spread, converting the produced colours into a label map is not straightforward.

Some segmentation based techniques, used to identify regions to be labelled, more directly address the problem of label propagation. Such systems often rely on motion and colour information to propagate regions through the sequence. Comparison of such techniques is difficult in the absence of labelled groundtruth data.

Other local representations exist for segmenting and robust tracking, such as Maximally Stable External Region (MSER) tracking or Scale Invariant Feature Tracking (SIFT) tracking, however they are sparse features and are, as such, not sufficient to track entire regions.

SUMMARY OF THE INVENTION

It is an object of the present invention to provide good methods and systems for processing video data as well as applications making use thereof. It is an advantage of embodiments according to the present invention that systems and methods are obtained providing accurate semi-automatic or automatic processing of video data, resulting in substantially accurate data. It is an advantage of embodiments according to embodiments of the present invention that efficient processing of video data can be obtained in combination with processing providing substantially accurate data.

The above objective is accomplished by a method and device according to the present invention.

The present invention relates to a method for processing video data comprising a plurality of images, the method comprising obtaining for each of said plurality of images, a segmentation in a plurality of regions and a set of keypoints and tracking at least one region between a first image and a subsequent image based on an appearance of the at least one region and a region in said subsequent image; and finding a matched region in the subsequent image taking into account a matching between keypoints in the first image and the subsequent image. In finding a matched region in the subsequent image by appearance all the pixels of a region may be used in the comparison whereas matching keypoints uses only a limited number of pixels. It is an advantage of embodiments according to the present invention that processing of video data combines the use of keypoints and appearance of a region in various ways for determining propagation of regions, resulting in time efficient and substantially accurate processing. It is an advantage of embodiments according to the present invention that the amount of manual labelling of objects in videos, which is a tedious task, can be limited and/or reduced while still obtaining a good representation of the objects throughout the video data.

Tracking at least one region between a first image and a subsequent image may comprise associating at least one first keypoint to the at least one region in said first image, matching a subsequent keypoint in said subsequent image with said first keypoint and determining a matching of the at least one region with a subsequent region in said subsequent image based on information regarding said matched keypoints. It is an advantage of embodiments according to the present invention that by using keypoint tracking, the tracking of regions can be done in a robust way. It is an advantage of embodiments according to the present invention that systems and methods are provided that allow automated and/or automatic region tracking as well as propagation of labels starting from only a single labelled frame.

Matching a subsequent keypoint with the first keypoint may comprise bi-directional matching. Bi-directional matching thereby may comprise checking the matches starting from a first image going to a subsequent image and checking all matches starting from the subsequent image going to a first image. Both types of matches then may be compared and the common matches may be considered as robust or appropriate matches. It is an advantage of embodiments according to the present invention that providing bi-directional keypoint detection or matching results in a low number of false positives. It is an advantage of embodiments according to the present invention that numerous robust keypoint matches are obtained in an efficient way.

The tracking furthermore may take into account a measure expressing how much the first region and the subsequent region are similar in appearance, e.g. using a similarity measure or how much the first region and the subsequent region have in common. Such a measure may be based on a histogram indicating the number of pixels that are similar in the different regions. It is an advantage of embodiments according to the present invention that systems and methods are provided allowing region matching which may be based on inclusion similarity and connected regions between the regions.

Two regions, one from the first image and the other from the subsequent image may be matched if they have a number of matching keypoints in common (which is non-zero) and if their overall similarity or what they have in common is larger than a predetermined value. The match may be better if the number of matched keypoints is a maximum.

The tracking furthermore may take into account groups of connected regions in the first and/or the subsequent image. It is an advantage of embodiments according to the present invention that over-segmentation may be applied, reducing the risk of having two objects merged.

The method may further comprise obtaining a label for at least one object in the first image, the object comprising at least one of a region or a keypoint, and propagating the label to the object in the subsequent image using the correspondence between the at least one region or keypoint in the first image and the at least one region or keypoint in the subsequent image. It is an advantage of embodiments according to the present invention that efficient and substantially accurate propagation of labels can be performed in an automatic and/or automated way. It is an advantage of embodiments according to the present invention that such propagation can be performed with a reduced or without interaction of the user.

Propagating the label may comprise obtaining a keypoint-label for a first keypoint in the object in the first image based on the label of said object, it may comprise associating a corresponding keypoint-label to the matching subsequent keypoint based on the keypoint-label for the first keypoint, and it may comprise deriving a label for the object in the subsequent image based on the keypoint-label of the subsequent keypoint in the subsequent image. It is an advantage of embodiments according to the present invention that a high propagation accuracy can be obtained, which reduces greatly the task of the human labeller.

Propagating the label may comprise obtaining a region-label for a first region in the object in the first image based on the label of said object, associating a corresponding region-label to the matching subsequent region based on the region-label for the first region, and deriving a label for the object in the subsequent image based on the region-label of the subsequent region in the subsequent image.

A keypoint in the image may comprise a pixel location and an area surrounding the pixel location having an average radius. It is an advantage of embodiments according to the present invention that the region tracking process may be particularly advantageous to match segmented regions whose shapes can vary greatly. The segmentation may be an over-segmentation of the image.

The present invention relates to a processing system for processing video data comprising a plurality of images, the system comprising a means for obtaining a segmented image, for each of the plurality of images in the video data, the segmented image being segmented in a plurality of regions, a means for obtaining a set of keypoints for each of the plurality of images in the video data, and a region tracking means for tracking at least one region between a first image and a subsequent image taking into account an appearance of the at least one region and the region in said subsequent image and taking into account a matching between a matching between keypoints in the first image and the subsequent image. The result is a matched region in the subsequent image. Two regions, one from the first image and the other from the subsequent image may be matched if they have a number of matching keypoints in common (which is non-zero) and if their overall similarity or what they have in common is larger than a predetermined value. The match may be better if the number of matched keypoints is a maximum.

It is an advantage of embodiments according to the present invention that systems and methods are provided allowing tracking of segmented regions or label propagation by combining both keypoint tracking and an advanced multiple region matching. It is an advantage of embodiments according to the present invention that the methods an systems can be combined with user interaction for interactively correction of errors in difficult cases, resulting in an improved performance and imposing regularity constraints on the track to handle full occlusion. It is an advantage of embodiments according to the present invention that regions are tracked using both tracked keypoints and flexible region similarity measures to benefit from both local representations, i.e. robustness and density.

The system furthermore may comprise a label obtaining means for receiving at least one label for a first image, and a label propagating means for propagating the at least one label in the subsequent image using the correspondence between the at least one region or keypoint in the first image and the at least one region or keypoint in the subsequent image.

The present invention also relates to an application system for performing an action, the application system comprising a processing system as described above and a controller for controlling the action taking into account tracked region information for the video data obtainable using the processing system.

The application system may be adapted for controlling the action taking into account propagated label information for the video data obtainable using the processing system.

The application system may be an automotive vehicle.

The present invention furthermore relates to a method for controlling an application system, the method comprising processing video data as described above and deriving from the processed video data control instructions for controlling the application system.

The application system may be an automotive vehicle and deriving control instructions may comprise deriving driving instructions.

The present invention also relates to a computer program product for performing, when executed on a processing means, a method for processing video data.

Furthermore, a machine-readable data storage device storing the computer program product as described above and transmission of such a computer program product over a local or wide area telecommunications network.

It is an advantage of embodiments according to the present invention that, unlike existing motion-based approaches, embodiments of the present invention can rely only on appearance-based tracking. The latter provides the ability to ignore motion models and to track objects even when they undergo large displacements or when the video capture frame rate is low.

It is an advantage of embodiments according to the present invention that a high accuracy can be obtained, as will by way of illustration be illustrated for a driving video sequence which contains multiple objects with independent motions.

It is an advantage of embodiments according to the present invention that tracking regions, e.g. salient parts of objects, can be correctly tracked. The latter may be based on joint keypoint tracking and region tracking.

It is an advantage of embodiments according to the present invention that a flexible but robust technique is obtained for automating the propagation of object labels in video. The propagation may be based on joint keypoint tracking and region tracking.

It is also an advantage of embodiments according to the present invention that difficult object parts, e.g. textured regions, can be efficiently tracked using similarity measures dedicated to oversegmented regions.

It is an advantage of embodiments according to the present invention that variations in segmentation can be accommodated and corrected, even in the presence of multiple independent motions and partial occlusions.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
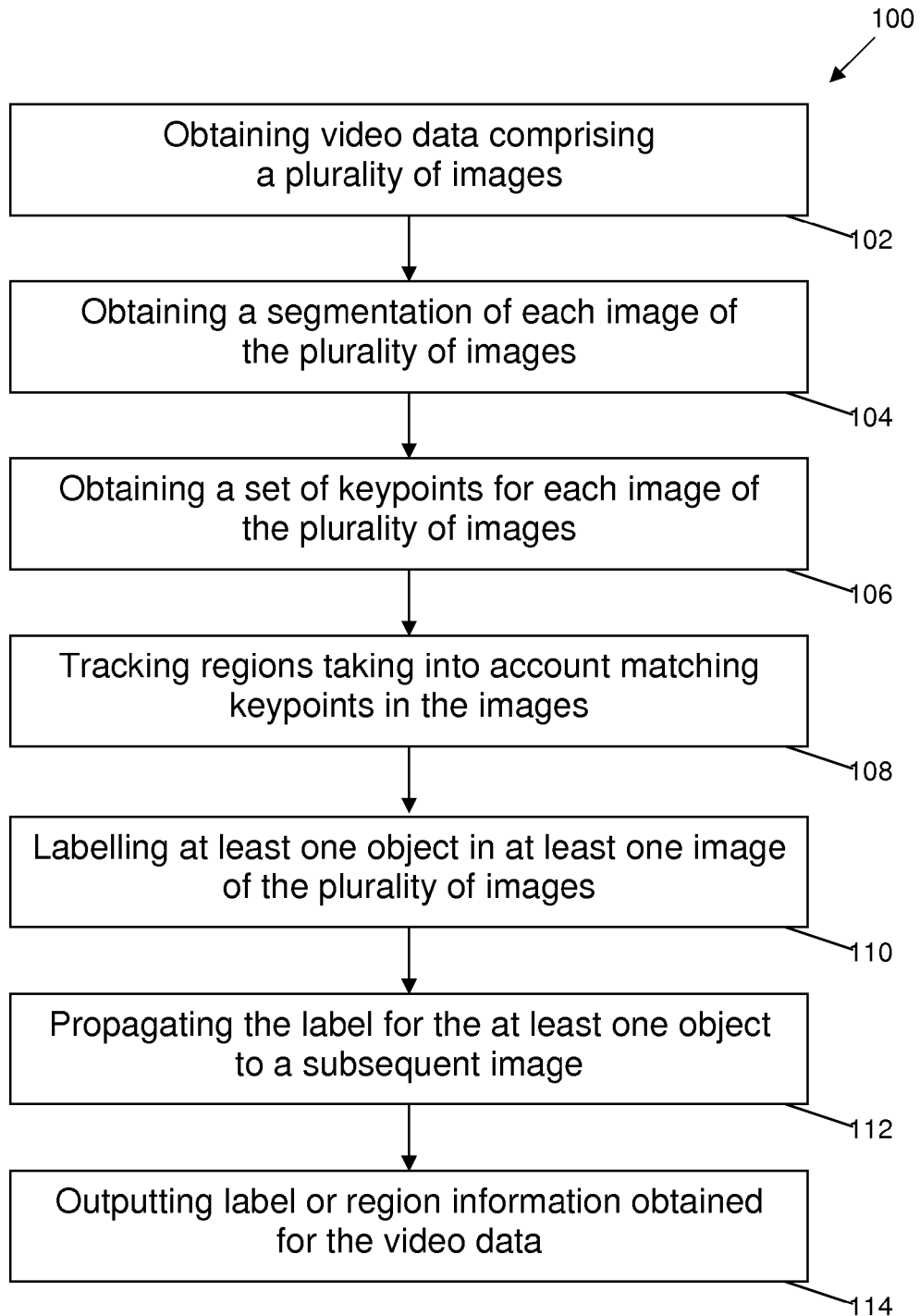
FIG. 1 is a schematic overview of an exemplary method for processing video data according to an embodiment of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the term first and the like in the description and in the claims, is used for distinguishing between similar elements and not necessarily for describing a sequence, either temporally, spatially, in ranking or in any other manner. It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention. Combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

It is to be noted that the term "automatically" is used at several points in the description. In some embodiments, the automatic task may be performed after the user commands the system to do so, e.g., by a click on a graphically displayed button, and in other embodiments, the automatic task may be performed with no explicit user command, such as a click on a graphically displayed button. The terms "automatic" and "automatically" encompass both cases.

The term "first image" refers to the image used as starting point in the particular processing step. It does not need to be the first image of a sequence. Although subsequent images are used, the systems and methods according to the present invention may be applied to the image sequence in normal and/or inverted order, e.g. starting with the last image and tracking regions or labelling backwards. The term "first image" thus is only used to refer to the image for which the information is obtained or calculated and from which further processing, such as e.g. tracking or propagating, is done.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

In a first aspect, the present invention relates to a method for processing video data comprising a plurality of images. The video data thereby may comprise a sequence of images, e.g. indicating the motion of one or more objects in a scene. The video data may be obtained in any suitable way, such as for example by capturing, e.g. using an optical detection or recording system, such as for example a camera, by calling it from a stored position in a memory, etc. The video data may comprise analogue video data or digital video. The video data may comprise 3 dimensional video data. Video data particularly of interest, although the invention is not limited thereto, is video data recorded from a moving object, such as for example a driving car. The latter may be of particular interest as one of the applications for the processing may be the use of video processing for automation and security reasons in vehicles. Appropriate processing of the video data may for example be used for recognition and reporting of main objects relevant to the moving object, e.g. vehicle, or to the driver thereof. Objects of interest may be any suitable object, such as for example and not limited to, the road, pedestrians, vehicles, obstacles, traffic lights, etc. Processing of the video data may be performed in real-time or may be performed on stored video data. Methods and systems according to embodiments of the present invention do not assume small object displacements or a high video capture frame rate.

According to the first aspect of the present invention, a method comprises obtaining, for each of the plurality of images, a segmentation in a plurality of regions and obtaining, for each of the plurality of images, a set of keypoints. Keypoints may be reference elements in the image. The method further comprises tracking at least one region between a first image and a subsequent image resulting in a matched region in the subsequent image. The subsequent image may be an adjacent image in a video sequence or may be a later image in the sequence. This tracking is performed taking into account a matching between keypoints in the first image and the subsequent image. In other words, tracking of regions in an image sequence of video data may be performed by combining keypoint tracking and region segmentation analysis. The latter results surprisingly in advantageous tracking of regions, having good accuracy as well as being computationally efficient. Taking into account keypoint matching may be performed by associating keypoints and regions to each other.

By way of illustration, the present invention not being limited thereto, different standard and optional steps of a method 100 for processing video data are shown in FIG. 1 and will be further discussed below in more detail.

Figure 2:
FIG. 2 is a schematic representation of oversegmentation of an image as can be used according to an embodiment of the present invention.

The present invention will mainly be applied to real video data, i.e. video images taken of real surroundings and not video data that has been generated by computer. The method operates on video data comprising a plurality of images, i.e. on an image sequence of video data. This image sequence may be already available at the initiation of the method 100. Alternatively, an optional step 102 of obtaining the video data comprising a plurality of images first may be performed. Such obtaining may be receiving stored video data, e.g. on an optical disk or via a network, or may be acquiring video data by recording using a camera. The latter may result in obtaining real-time or streaming video as well as obtaining a full video data set at the time, which then may be locally stored for processing. In some embodiments, the image sequence may be available from a testbed. The latter may for example be used when training a system for recognition of objects in video data if performed. The plurality of images thereby does not need to comprise all frames of a video sequence as originally recorded, but may for example be only a selected part thereof, depending on the images of interest and the required accuracy of the processing. Advantageously, the video data comprises consecutive images, but the time lapsed between different consecutive frames may for example be selected in view of the required accuracy. In one example, the lapsed time between the consecutive frames may be limited which may result in smaller differences between the images. Alternatively or in addition thereto, performing pre-smoothing may be done in order to sub-sample. The latter may allow that the system can run at smaller resolutions as the scenes may be easier. The resolution and/or the frame-rate may be relatively low when the vehicle is moving slowly or stuck in traffic. By way of example, a frame-rate of 30 frames per second for normal driving in a city may be fine. It is an advantage of embodiments according to the present invention that the method does not rely intrinsically rely on high frame rate, unlike motion-based methods. The method comprises, in step 104, obtaining, for each of the plurality of images, a segmentation in a plurality of regions. This step may for example be merely receiving a segmented version of the images of the video data, whereby the segmentation as such is done in a separate process, not being part of the method. Alternatively, obtaining a segmentation for each image may comprise the actual step of performing segmentation for each image. The images may be segmented using any suitable segmentation technique such as for example thresholding, edge detection, snake contours, morphological methods, clustering-base methods, the invention not being limited thereto. The segmentation technique can be any, i.e. which either groups together adjacent and similar pixels or, dually, which detects contours (the region boundaries). Advantageously the chosen segmentation technique is tuned for "oversegmentation", which can be done by setting a fine granularity in the grouping (or high sensity in contour detection). The algorithm advantageously is a robust one, for repeatitiveness across frames. Image analysis such as segmentation of images has been studied intensively and is widely reported in the literature, e.g. "A review on image segmentation techiques", N. R. Pal, 26, 9 pp 1277-1294, Pattern Recognition, 1993, Traitement de l'image sur Micro-ordinateur" Jean-Jacques Toumazet, Sybex, 1987, "Variational methods in image segmentation", J-M Morel and S Solimini, Birkhäuser, 1995, "Image Analysis" Leszek Wojmar, CRC Press 1999, "Intelligent Vision Systems for Industry", Springer, 1997. For example for edge detection methods are know such as top-hat filter, Prewitt operator, Roberts operator, Sobel operator, Laplacian filter, zero crossing operator, wateshed detection. The segmentation technique may be selected as function of the type, e.g. complexity, size or number of images in the video data that is to be dealt with. For example, the computational efficiency of segmentation techniques may be taken into account in view of the amount and difficulty of the video data to be processed. Each frame of the plurality of images may be segmented individually. In one embodiment, over-segmentation of the image may be performed. An example of an over-segmented region is illustrated in FIG. 2, illustrating that some objects are not fully comprised in a single segment but correspond with the combination of a plurality of segments. The latter reduces the risks of having two basically separate objects merged together. Furthermore a median filter may be applied on the segmented image to smoothen the region boundaries.

The method further comprises in step 106 obtaining, for each of the plurality of images, a set of keypoints. This step may for example be merely detecting a set of key points for each of the images, whereby the detection and matching of the key points is done in a separate process, not being part of the method. Alternatively, obtaining a set of key points for each image may comprise actually detecting/extracting a set of keypoints for each image. The keypoints advantageously are robust keypoints, having for example good repeatability across the frames. The keypoints may be obtained using any suitable technique, such as for example but not limited to a Scale Invariant Feature Tracking (SIFT). Any key point detector can be used provided that it estimates the key point scale. Other detectors include "Multiscale keypoint detection using the dual-tree complex wavelet transform", J. Fauqueur, N. Kingsbury, R. Anderson, ICIP 2006 or "Scale & affine invariant interest point detectors", K. Mikolajczyk C. Schmid, IJCV 2004. The keypoint detection may be based on context dependent keypoint detection. In some embodiments, obtaining keypoints for each image furthermore may comprise matching the keypoints across different frames, optionally across each pair of consecutive frames, e.g. across frame A and frame B. In an advantageous embodiment, bi-directional keypoint detection and matching may be performed, i.e. the keypoints may be matched starting with frame A and going to frame B and also starting with frame B and going to frame A and the matches that are mutual may be selected to be the keypoints to be used. In this embodiment, a keypoint $k_A$ in A which matches $k_B$ in B is kept if $k_B$ matches $k_A$ and vice versa. This bi-directional matching technique proves to be very effective to obtain numerous robust keypoint matches. Obtaining a set of keypoints furthermore may comprise obtaining an estimate of their scale. The latter may be useful to use the scale for association between the keypoints and the regions. In some embodiments it may be chosen to reject keypoints based on the distance to the second closest matching keypoint. The latter allows more correct keypoint matches. In some embodiments, matches may be rejected for which the inter-keypoint distance between matching keypoints in consecutive images is larger than a predetermined number of pixels, e.g. larger than 200 pixels. It is to be noticed that the steps of obtaining segmentations and obtaining sets of keypoints can be interchanged.

As shown in FIG. 1, a method according to the present invention furthermore comprises tracking 108 at least one region between a first image and a subsequent image resulting in a matched region in the subsequent image. The latter is performed taking into account a matching between keypoints in the first image and the subsequent image. In other words, not only the appearance of the regions is used for the tracking, but also keypoint matching is taken into account for tracking the regions. By way of example, the present invention not being limited thereto, some particular features for this tracking step will now first further be discussed in the following particular embodiments.

First, a number of descriptors that may be used in some particular embodiments of the process will be described. The changes in segmentation over consecutive frames may imply that most regions can potentially match many regions. Tracking regions may comprise comparing the region appearance. For comparing and or matching the appearance of segmented regions, particular descriptors and similarity measures may be used. Descriptors that may be used for colour may be the average colour, or the colour histogram. Descriptors that may be used for shape may be compactness and eccentricity. Descriptors that may be used for texture may be a Gabor-based descriptor. Such descriptors are especially suitable for matching very similar regions. Advantageously other descriptors and similarity measures may be used for the global appearance of regions. Such descriptors can be used even if there is a noticeable change in geometry of the regions, like a change in boundaries, area and/or shape. The similarity measures that may be used for tracking regions may be based on measurement of how much they have in common rather than how similar they are overall. It is an advantage of this descriptor that it can adequately match segmented regions (which have the specificity of being fragments of one another). One similarity measure that may be used for, and which is a simple and efficient solution, is the Histogram Intersection similarity measure. Given two regions $r_A$ and $r_B$ and their respective colour histograms $h_A$ and $h_B$, the Histogram Intersection $HI(r_A, r_B)$ counts how many pixels are similar in $r_A$ and $r_B$:

$$HI(r_A, r_B) = \sum_{i=1}^{n} \min(h_A(i), h_B(i)) \qquad [1]$$

where n denotes the number of quantized colours. Unlike classic measures, the strength of the Histogram Intersection is to completely ignore pixels which fall in different bins. Further appearance similarity may be derived from the Histogram Intersection similarity measure, which model two different types of appearance similarity between regions. According to an embodiment of the present invention, the normalized Histogram Intersection may be used as an inclusion similarity measure between two regions $r_A$ and $r_B$ in consecutive images. The latter may for example be defined by $$m_I(r_A, r_B) = HI(r_A, r_B)/\text{card}(r_A) \qquad [2].$$

This is not a symmetric measure but it takes values in the interval [0;1] and is maximal where all pixels in the first region $r_A$ have a similar pixel in the second region $r_B$, i.e. where the first region is a complete part of the second region. According to an embodiment of the present invention, a similarity measure for the overall similarity also may be used. The latter may for example be defined by $$m_O(r_A, r_B) = HI(r_A, r_B)/\max(\text{card}(r_A), \text{card}(r_B)) \qquad [3].$$

This function is maximal, i.e. equal to 1, when both first region $r_A$ and second region $r_B$ have the same number of similar pixels.

Figure 3:
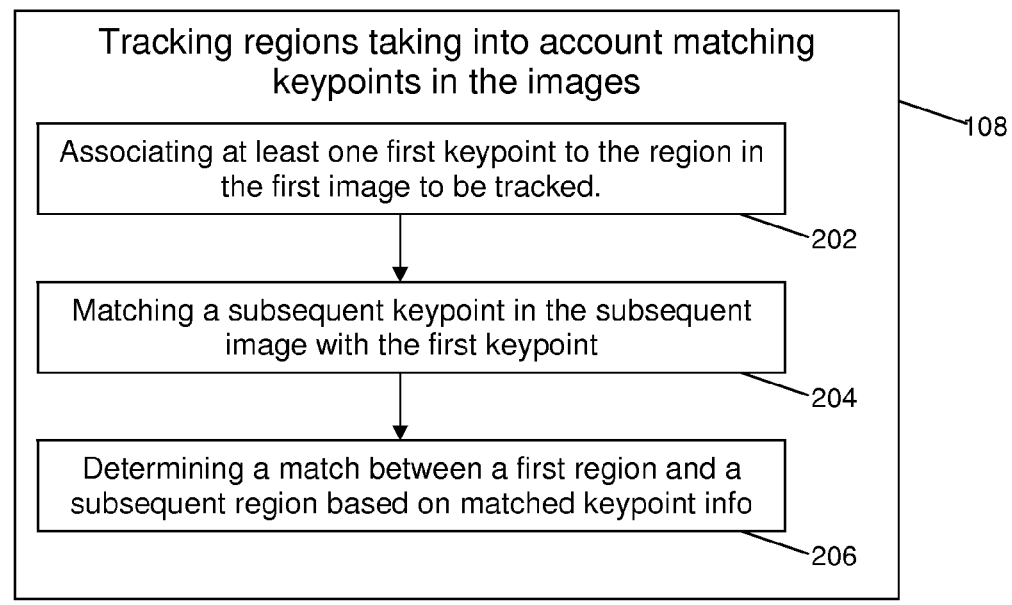
FIG. 3 is an exemplary method for tracking a region in subsequent images based on keypoint matching and association, according to a particular embodiment of the present invention.

In one first particular embodiment according to present invention, the present invention not being limited thereto, the tracking step 108 for tracking a region between a first image and a subsequent image may comprise first associating 202 at least one first keypoint to the at least one region in the first image to be tracked, matching 204 a subsequent keypoint in the subsequent image with the first keypoint and then determining 206 a matching of the at least one region with a subsequent region in the subsequent image based on information regarding the matched keypoints. The steps performed in this particular embodiment, have been illustrated in FIG. 3, by way of example.

Associating 202 at least one first keypoint to the at least one region in the first image to be tracked may be performed by, when considering keypoints, not only considering the pixel location of the keypoint as such but also take into account the region surrounding it. A keypoint thus may be viewed as a disc region whose radius is given by its scale which defines its support. A keypoint may be associated with a region if at least half of its support disc intersects with the region. For efficiency also the square embedded in the disc rather than the entire disc may be taken into account. Stable matches may be restricted to those regions with at least one keypoint for stable matches. Such association may be used for tracking of regions as described in the present embodiment, but also in propagation of labels as will be illustrated further. Although the invention is not limited to such type of associating 202 and for example associating a first keypoint to a region may be performed, whereby the keypoint is only considered to be a single particular pixel location, taking into account the region surrounding it results in robust association.

The matching 204 of keypoints may be an optional step that has already been performed and therefore does not have to be repeated. The information may for example already be available, e.g. obtained during the obtaining step of a set of keypoints for each image, as described above. Alternatively or in addition thereto, the matching 204 may be done at this moment in the method 100 for processing, e.g. using the bi-directional matching as described above.

Determining 206 a matching of the at least one region with a subsequent region in the subsequent image then is based on information regarding the matched keypoints. As described, keypoints may be associated with labeled regions in the same frame (step 202) and matched with keypoints in the next frame (step 204). By transitivity, the matched keypoints between two frames can be used to match their corresponding regions. Thus the region associated to the first keypoint is correlated to the region associated to the corresponding matched keypoint.

The present particular embodiment illustrates one example of how tracking a region can take into account keypoint information. By using associated keypoints, the error and complexity of the overall tracking process can be reduced. Since regions can have more than one keypoint, a region may be matched to the one which shares the most matching keypoints. This strategy can be a sufficient condition to ensure that the two regions cover a common patch of the scene (up to the keypoint matching accuracy). Furthermore a constraint on overall similarity to match those regions may be added to avoid, for instance, a tiny region matching a much larger one. The overall appearance similarity measure $m_o(r_A, r_B)$ as defined in equation [3] may be used for expressing the constraint on the overall similarity. Therefore, two regions are called stable regions if they have a maximum number of matching keypoints in common (which is non-zero) and if their overall similarity is larger than a predetermined value, i.e. $m_o(r_A, r_B) \geq \tau_O$. A value of $\tau_O=0.3$ was found to be sufficient to reject unlikely matches. Both regions are said to constitute a stable match for each other. The stable matches for a region r may be expressed by $M_s(r)$.

According to a second particular embodiment of the present invention, a method according to the present invention may, in addition to matching regions comprising keypoints as described in the first particular embodiment, comprise matching other regions. Such regions may have no keypoints present or may have keypoints which could not be associated with regions. Such regions may be referred to as "ambiguous regions". The regions may for example exhibit very little variation (such as sky, grass, road, uniform areas) and are harder to register. They tend to be fragmented by the over-segmentation into similar regions whose shapes vary greatly across frames. As a consequence, they are the most challenging regions to match. Matching of these regions may be based on a procedure whereby the number of similar pixels in common between different regions is determined. By counting the number of similar pixels in common between two regions, the inclusion similarity measure $m_I$ is a natural solution to match similar regions obtained from different segmentations. With $r_A$ a region in frame A and $r_B$ a region in the subsequent frame B, all non-stable regions in A potentially included in a region in B can be determined and the closest one to region A is defined as $$M_a(r_A) = \arg\min\{\|r_B - r_A\| | m_I(r_A, r_B) \geq \tau_I\} \quad [4]$$

where $\|.\|$ denotes the inter-region distance defined as the Euclidean distance between their centre of mass. Any other distance may be used which measures the spatial proximity between regions, for example distances which would take into account the regions topology. Conversely for frame B, non-stable regions in B can be determined potentially which are included in a region in A. The closeset one to region B is defined as $$M_a(r_B) = \arg\min\{\|r_A - r_B\| | m_I(r_B, r_A) \geq \tau_I\} \quad [5]$$

Matching of ambiguous regions may be performed by requiring that a predetermined number of pixels is in common between a first region in a first frame and a subsequent region in a subsequent frame. It thereby may be required that $r_A$ has at least half its pixels in common with $r_B$, by setting $\tau_I=0.5$. Note that ambiguous matches are asymmetric whereas stable matches are symmetric: if $r_A$ is a stable match for $r_B$ then $r_B$ is a stable match for $r_B$, but if an ambiguous region $r_A$ matches $r_B$ (which can either be a stable or an ambiguous region), then $r_B$ is not necessarily an ambiguous match for $r_A$.

In a third particular embodiment, additional contextual information regarding the regions may be taken into account to consolidate multiple matching regions and thus to assist in tracking. The latter may assist in solving some false matches if these would persist. In particular, since previously multiple regions were allowed to match a same region (to handle changes in segmentation), only the best group of connected first/subsequent regions which match a same subsequent/first region should be regarded to be the tracked region. Taking into account additional contextual information may be especially suitable for matching such multiple matching regions. The latter is now described in more detail. For each region in a frame A, the ambiguous region is considered that matched the region as well as the regions that match it in the next frame B. So both information of the first frame and information of the subsequent frame is used, and it is the combination of this information that results in the best match. This group of matching regions is denoted as M. Among those regions, only the group of connected matching regions whose histogram maximizes the similarity for the region may be considered. The work-flow may be the following:

in a first step, the matching regions in B are listed: for each region $r_A$, $M_a(r_A)$ denotes its ambiguous match. The ambiguous regions which match $r_A$ are denoted as $M_a^{-1}(r_A) = \{r_B | M_a(r_B) = r_A\}$ and the stable ones as $M_s^{-1}(r_A) = \{r_B | M_s(r_B) = r_A\}$. So the set of potential matches for $r_A$ is $$M = M_a(r_A) \cup M_a^{-1}(r_A) \cup M_s^{-1}(r_A) \quad [6]$$

in a second step, the groups of connected matching regions in B are listed: among regions in M only the groups of connected regions which contain stable regions (if any) are listed. Such a group is written as $$G=\{r\in M | U_r \text{ is connected and } U_r \supset M_s^{-1}(r_A)\} \quad [7]$$

in a third step, the best adjacent group is found: the best group of regions may be defined as the set G* which maximizes the overall appearance similarity between $r_A$ and all groups $G$: $G^*=\text{argmax}\{m_o(r_A,G)\}$. $m_o(r_A,G)$ thereby denotes the similarity between $r_A$ and the set of regions G which is defined as $$\sum_{r\in G} HI(r_A, r) \Big/ \max\!\left(\text{card}(r_A), \sum_{r\in G}\text{card}(r)\right).$$

Regions in M\G* may be released as these match the "void" class.

Figure 4:
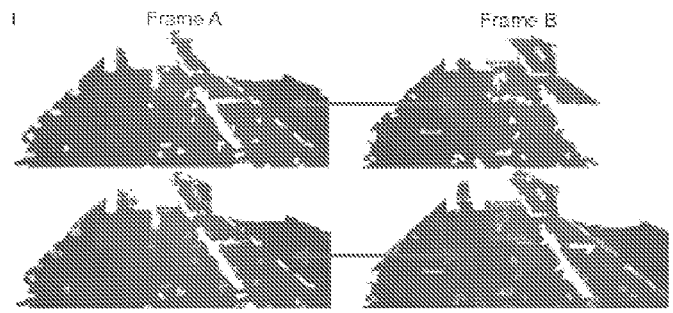
FIG. 4 is a schematic representation of matching of segmented regions for ambiguous matching and multiple region matching between two consecutive frames as can be used according to an embodiment of the present invention.

The same workflow is then applied between the frame B and A (simply by swapping A's and B's in the notations). By way of illustration, the present invention not being limited thereto, an example of multiple region matching is illustrated in FIG. 4. Two segmented road regions, having different shapes but similar appearance, are shown for two consecutive frames (left versus right figures). By selecting the best arrangement of connected regions, the two final matched groups of connected regions produce two more coherent regions and hence a better match. In the present example the above identified iterative 3-step process is illustrated. The top regions were mutually matched in step 1 (applied to each frame), in spite of their shape difference. In steps 2 and 3, many small connected regions matched the big region in the other frame, thanks to the inclusion similarity measure and the adjacent region grouping strategy. The bottom row shows the final optimal match between the groups of connected regions (tiny and big ones) in both frames. In the propagation step, both groups will be considered as two single regions which are more coherent than the initial big ones alone. This shows that this strategy can cope with variable regions and even improve the final segmentation. Note that a classic region merging algorithm applied to each frame separately could not offer the same performance, because it is harder to assess whether two adjacent regions belong to the same region.

Returning now to the exemplary method as illustrated in FIG. 1, the tracking of the region thus results in an association between regions across two frames. At the end of this matching process, a few regions can be left unmatched when they did not meet the above criteria because they are too ambiguous or because they belong to an object which has disappeared. It is an advantage of embodiments according to the present invention that the above steps of extracting regions and keypoints and matching may be done automatically without user interaction. The region tracking of the tracking step 108 may comprise combination of matching regions using keypoints, matching ambiguous regions as such and matching regions using contextual information, e.g. taking into account connectivity of the regions.

In optional steps, obtaining 110 a label of at least one object in a first image may be performed and propagating 112 of the label to the object in the subsequent image may be performed. Obtaining a label 110 may comprise obtaining a previously labelled first image. Alternatively the labelling may be performed within the method. Obtaining a label 110 may comprise labelling, e.g. manually labelling, all objects in the first image. Obtaining a label may be done at any moment during the performance of the method, as long as it is done prior to or together with the propagating of the at least one label. The labels may represent for example selected classes of objects, such as for example, pedestrians, bicycles, cars, buildings, road, air, grass, pavement, etc. although the invention is not limited thereto.

Figure 5:
FIG. 5 is an illustration of a first image of video data and a corresponding manually labelled image, as can be used for an example according to an embodiment of the present invention.
Figure 6:
FIG. 6 is an illustration of a last image of video data and a corresponding manually labelled image, as used in an example according to an embodiment of the present invention.

The propagating 112 of labels may be performed using matched keypoint information. Propagating 112 the label to the object in the subsequent image may be performed using the correspondence between the at least one region or keypoint in the first image and/or the at least one region or keypoint in the subsequent image. The labels from the input map may be associated with regions and keypoints in the first frame, and then the labels may be propagated in subsequent frames using the tracked keypoints and/or the tracked regions. The label propagation thus may make use of the region tracking as described in step 108. In one particular example, propagating the label may comprise obtaining a keypoint-label for a first keypoint in the object in the first image based on the label of that object, associating a corresponding keypoint-label to the matching subsequent keypoint based on the keypoint-label for the first keypoint and deriving a label for the object in the subsequent image based on the keypoint-label of the subsequent keypoint in the subsequent image. Alternatively or in addition thereto, propagating the label optionally also may comprise obtaining a region-label for a first region in the object in the first image based on the label of the object, associating a corresponding region-label to the matching subsequent region based on the region-label for the first region and deriving a label for the object in the subsequent image based on the region-label of the subsequent region in the subsequent image. By way of illustration, the present invention not being limited thereto, an example of different steps for labelling is described in more detail. Let A denote a frame and B its subsequent one. Given a labelled frame $L_A$ corresponding to A (whether it be the first hand labelled frame or the previous estimated frame), the labelling comprises producing an estimated labelled frame $L_B$ for B. A labelled map may consist of uniform colour blobs which identify each object with a colour. An example thereof is shown in FIGS. 5 and 6, whereby for example one type of colour may be given for example for buildings. FIG. 5 thereby corresponds with a first standard (left) and labelled (right) image of an image sequence and FIG. 6 corresponds with a last standard (left) and labelled (right) image of an image sequence. Particular colours, such as for example black, may be used to indicate a "void" label and is used to refer to semantically ambiguous areas. By way of illustration, the present invention not being limited thereto, a number of different optional features that may be used for propagating labels is described in a number of particular embodiments.

In a fourth particular example, propagation of labels is at least based on keypoint to label association in frames A and B. For the first frame, keypoints may be associated with labels by intersecting their support regions in A, as described above, with the labelled frame $L_A$. The label may for example be associated to the keypoint if the most frequent label appears at least on half its support region. Since the keypoint matches can be robust and their support regions are small, this association can be robust. The keypoint-label association for frame B thus can be directly provided based on the corresponding matching keypoints. For the subsequent frames, the keypoint-label association will then be provided by the previous frame.

In a fifth particular example, propagation of labels is at least based on region to label association in, frames A. Likewise as in the fourth particular example, by intersecting the segmented map of A with the labelled frame $L_A$, each region can be associated with the most frequent label within its area.

Many regions in A (who have now a label) are likely to match a same region $r_B$ from the previous matching process, i.e. the region matching or tracking as described in step 108. For each region in frame B $r_B$ the most frequent label $I_R$ among the $r_A$'s which match $r_B$ may be considered. If $r_B$ contains keypoints which have been assigned a label then $I_K$ the most frequent of these labels is considered within $r_B$. Most of the time $I_R$ and $I_K$ will coincide. If they do not coincide and one of them is "void" then the other label is assigned to $r_B$. If they are different and not void, then $I_K$ is assigned if more than one keypoint has it or $I_R$ is assigned otherwise.

Returning again to the method 100 illustrated in FIG. 1, the obtained label information furthermore may be used, in step 114, for particular applications. One example of an application may be the automated driving of vehicles, whereby the video processing may be used for recognising the main objects during the journey and, such as for example the main objects relevant to the driver of the vehicle like the road, pedestrians and vehicles, and wherein the obtained information about the objects during the journey is taken into account for the automated driving, e.g. for keeping track on the road, for avoiding collision with another object, etc. The method may then for example be used for a plurality of video data, e.g. recorded in different directions, and the obtained object information may be combined with other types of information such as speed sensors, position information, sound sensors, motion sensors, etc. An alternative application may be the use of label information for training systems or people for labelling video data.

Figure 7:
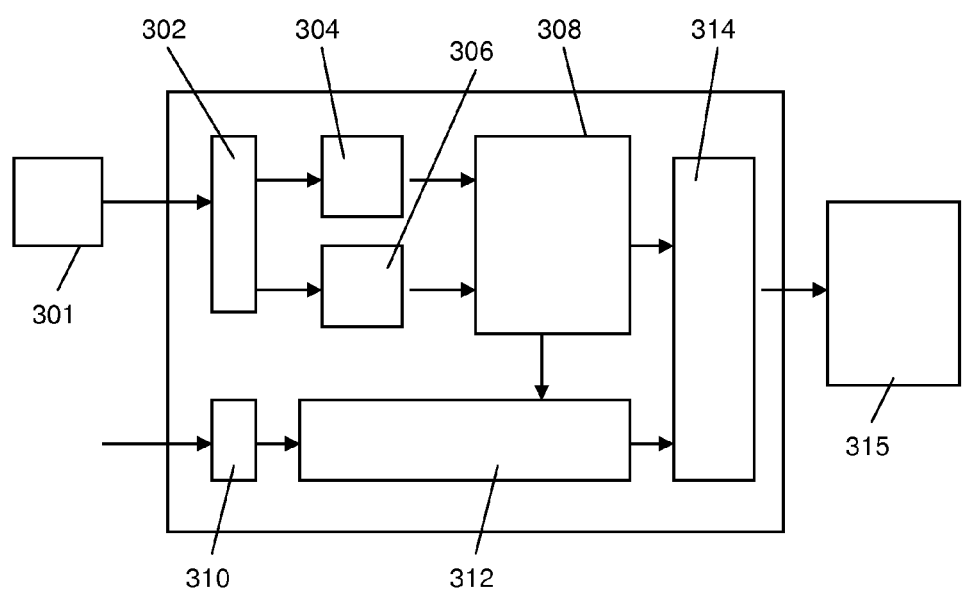
FIG. 7 is an illustration of an exemplary system for processing video data according to an embodiment of the present invention.

In a second aspect, the present invention relates to a system for processing video data comprising a plurality of images for obtaining tracked region information for regions in the images. The system furthermore may be adapted for obtaining label information for the plurality of images. An example of such a system 300 is shown in FIG. 7, showing standard and optional components. The system 300 may comprise an video data input means 302 for receiving the video data. The system may for example be connectable to an imaging device 301 for receiving the video data. Such an imaging device may be part of the system but may also be external thereto. According to the second aspect of the present invention, the system 300 comprises a means for obtaining a segmented image 304, for each of the plurality of images in the video data, the segmented image being segmented in a plurality of regions and a means for obtaining a set of keypoints 306 for each of the plurality of images in the video data. Each of these obtaining means may be input means for receiving such information from an external source or these may comprise processing power for performing segmentation and/or deriving a set of keypoints. According to the second aspect, the system also comprises a region tracking means 308 for tracking at least one region between a first image and a subsequent image resulting in a matched region in the subsequent image. The region tracking means 308 thereby is adapted so that the tracking of the at least one region is performed taking into account a matching between keypoints in the first image and the subsequent image. The system further may comprise components having the functionality of performing features or steps as set out for the tracking step of the method in the first aspect. Optionally, the system 300 furthermore comprises an label obtaining means 310 for receiving a labelled first image and a label propagating means 312 for propagating the labels for the objects to subsequent images. Again, such a label propagating means 312 may have the functionality of the label propagating step as described for the first aspect. The system 300 optionally also may comprise an output means 314 for outputting the region or label information for the video data. The latter can be used to provide information to the application systems 315 making use of the obtained results, such as e.g. a vehicle system or controller therein. Such application systems may be part of the processing system of the present aspect, but may also be external thereto. The system furthermore optionally may be adapted to have other components with the functionality of other features or steps of method embodiments of the first aspect.

Figure 8:
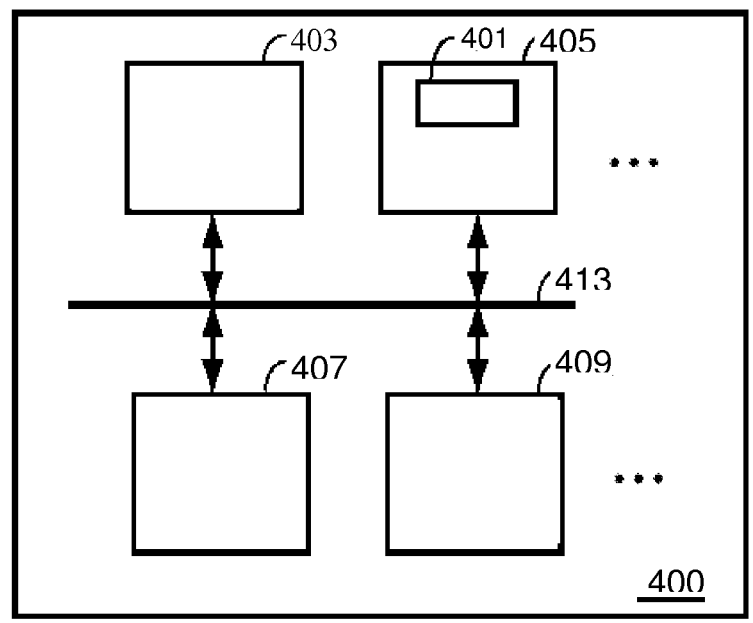
FIG. 8 is an illustration of a processing system whereon a method according to embodiments of the first aspect of the present invention can be implemented.

The different components of system 300 may comprise processing power for performing their function. The functionality of the different components of the system 300 or different method steps of the method 100 may be implemented in separate or a joint processing system 400 such as shown in FIG. 8. FIG. 8 shows one configuration of processing system 400 that includes at least one programmable processor 403 coupled to a memory subsystem 405 that includes at least one form of memory, e.g., RAM, ROM, and so forth. It is to be noted that the processor 403 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system may include a storage subsystem 407 that has at least one disk drive and/or CD-ROM drive and/or DVD drive. In some implementations, a display system, a keyboard, and a pointing device may be included as part of a user interface subsystem 409 to provide for a user to manually input information. Ports for inputting and outputting data also may be included. More elements such as network connections, interfaces to various devices, and so forth, may be included, but are not illustrated in FIG. 8. The various elements of the processing system 400 may be coupled in various ways, including via a bus subsystem 413 shown in FIG. 8 for simplicity as a single bus, but will be understood to those in the art to include a system of at least one bus. The memory of the memory subsystem 405 may at some time hold part or all (in either case shown as 411) of a set of instructions that when executed on the processing system 400 implement the steps of the method embodiments described herein. Thus, while a processing system 400 such as shown in FIG. 8 is prior art, a system that includes the instructions to implement aspects of the methods for processing the video data is not prior art, and therefore FIG. 8 is not labelled as prior art.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

Figure 9:
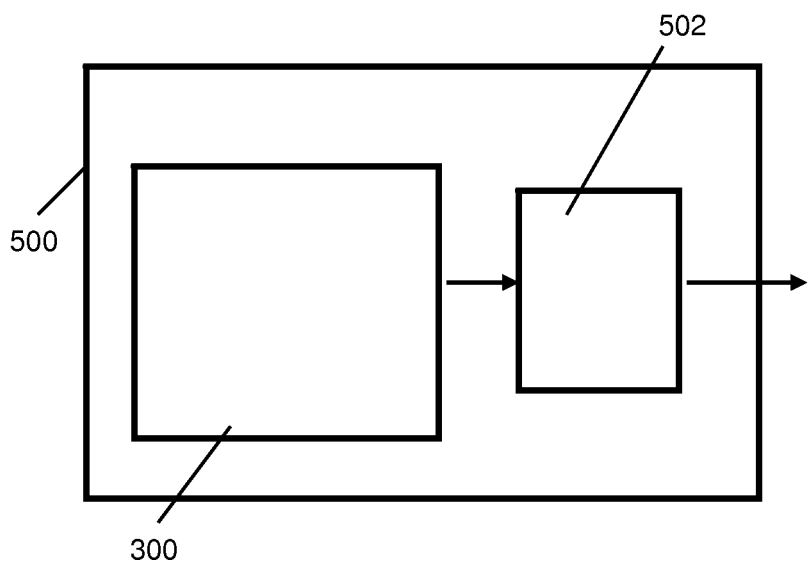
FIG. 9 is an illustration of an application system according to the third aspect of the present invention.

In a third aspect, the present invention relates to an application system, such as for example a computerised system, an automotive system e.g. vehicle, or any other system or automated system which may use information regarding moving objects in its surrounding. The application system comprises the processing system as described in the second aspect for processing video and furthermore comprises a controller that is adapted for using the obtained region or label information for the video data. The controller may use such data for controlling or assisting in controlling of its functioning. For example, when the application system is an automotive system, e.g. a vehicle, it may use the information for controlling or assisting in controlling of the driving of the vehicle. The controller may be adapted for receiving information from the video data processing system 300 and for deriving therefrom driving instructions. These driving instructions may be putted out either to the driving system of the vehicle for automated control of the vehicle, such as for example to control a speed, direction, system indicators in the vehicle, traffic indicators in the vehicle etc. Alternatively or in addition thereto driving instructions may be putted out to the user of the vehicle, e.g. using written or spoken instructions, thus indicating to the user that he may need to alter or take an action. The controller advantageously comprises a processing system for deriving from the region or label information obtained from the processing system 300 driving instructions. The latter may be based on a neural network, predetermined algorithm, etc. Such a controller thus may for example comprise a microprocessor or FPGA, the invention not being limited thereto. By way of illustration, a schematic overview of an application system 500 comprising a system for processing video data 300 and a controller 502 for deriving instructions, e.g. driving instructions, from the obtained label or region information is shown in FIG. 9.

EXAMPLE

By way of illustration, the present invention not being limited thereto, an example is shown of the video processing according to an embodiment of the first aspect. The method was implemented in a program written in C++ using the OpenCV library and run on a 2 GHz dual core PC. The example made use of a video data, being a video sequence recorded with a camera on a moving vehicle. The camera was mounted on the passenger seat in a car. A high definition digital camera was used, capturing 960×720 pixel frames at 30 fps. The reported results were obtained on a sub-sequence of 101 consecutives frames sub-sampled every other frames (from 202 frames). It corresponds to 6 seconds of continuous driving. No part of the scene remains static and various events occur involving multiple moving objects: crossing two cars (one makes a turn), following then overtaking bicyclists, three groups of pedestrians walking in both direction and a remote bus takes a turn. The first and last frames are shown in FIGS. 5 and 6 with their corresponding labelled frames. The total runtime for processing the 101 frames was 82 minutes (about 49 s/frame on average) of which 23 minutes were taken by the segmentation, keypoint extraction and region detection and description. Region tracking and propagation took the 59 remaining minutes, most of which are taken by a few cases when many region groupings are inspected. The actual propagation step, took only 0.6 s per image.

For the video data, an associated labelled groundtruth has been produced, in order to allow comparison between manual and automatic labelling. The groundtruth label set was produced manually for the 101 frames. The areas were painted corresponding to a predefined list of 32 objects of interest with a specific palette of colours. The manual labelling was performed using a program providing various automatic segmentations along with floodfilling and manual painting capabilities. The labelled sequence was corrected to make sure that no object was left out and that the "labeling style" was consistent across the sequence. By logging and timing each stroke, the hand labelling time for one frame was estimated to be around 20-25 minutes (this duration can vary greatly depending on the complexity of the scene). The first labelled frame was used to initialize the algorithm while the following 100 ones were used to compare the estimated labelled maps and report the accuracy of the method according to the present invention.

Segmentation

In the present example, the segmentation was performed using a Felzenswalb and Huttenlocher graph-based segmentation, producing appropriate results to capture areas of similar colour and texture. Given the rather large size of the images (960×720 pixels) its computational efficiency was also an advantage. Based on the assumption that a very homogeneous region belongs to the same object, an over-segmentation was produced of the video frame. It reduced the risks of having two objects merged together, while, according to the present example, it allowed for a better approximation of the hand-labelled regions. For the segmentation technique, the following values were selected: variance of Gaussian smoothing $\sigma=0.8$, granularity parameter $k=50$ and minimum region size of 50 pixels. On average this segmentation produced 1811 regions per image. As a comparison, the groundtruth handlabelled images had 150 hand-labelled regions on average on the same sequence. A median filter was applied to the segmented image to smooth the region boundaries, which tend to be more regular when drawn by a human.

Keypoint Detection

In the present example, keypoint detection was performed using the Scale Invariant Feature Tracking technique and using bi-directional keypoint matching as described above. Furthermore, rejection of matches was performed for matches whereby the inter-keypoint distance in the image space was larger than 200 pixels. About 2000 keypoints were kept based on this bi-directional strategy. It is to be noted that the keypoint matching produced very few false positives since frames in the video date of the present example were very similar.

Region Tracking

In the present example, the Histogram Intersection similarity measure was used as an appearance matching similarity measure, wherein the number of quantized colours was set to $6^3$, corresponding with 216 quantized colours in the Luv colour space. A region tracking method as described with respect to FIG. 1 was used. In particular, the use of keypoints surprisingly resulted in ver accurate registering of the regions to the same location in the scene and thus surprisingly accurately assisted in avoiding severe propagation of labelling errors. In the absence of any motion model, keypoints improved the region tracking in ambiguous cases, such as moving and repetitive pattern (e.g. as lane markings or a facade behind a fence). The use of keypoints and histogram intersection proved to be flexible and effective to match regions correctly in very challenging conditions such as for example multiple moving objects, partial occlusion and changes in segmentation. Mismatch problems usually include two moving objects which are connected in the image plane and for which a keypoint or a region switches from one object to another. This type of error could not be corrected automatically. Small objects such as sign poles were hardly tracked because of their small size and their lack of saliency. However, sometimes a single keypoint could help tracking a non-trivial region, such as a small shop sign. The region tracking strategy was able to merge similar adjacent regions consistently by matching them to larger regions in consequent frames. In spite of the over-segmentation, there were still situations where some part of an object was merged with the background if they had very similar appearance. This type of error is inherent to any unsupervised segmentation algorithm and only manual interaction could correct this type of error.

Label Propagation

Figure 10A:
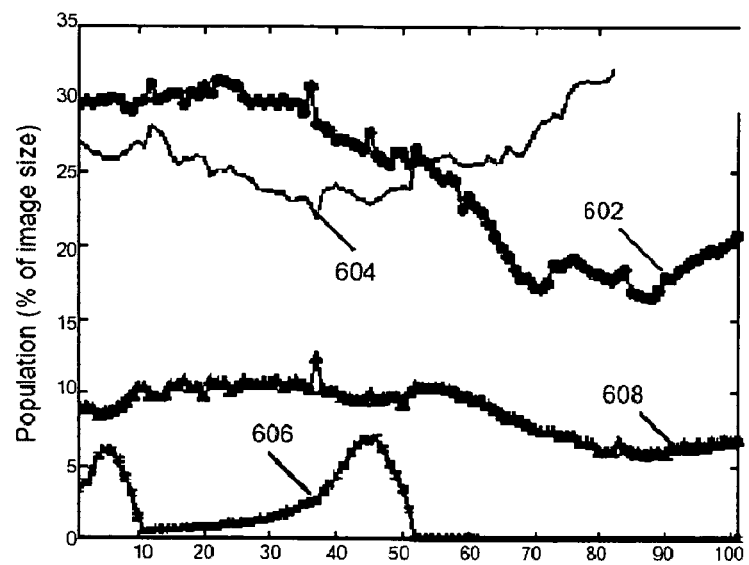
FIGS. 10 and 11 show label propagation normalised accuracy per frame for the sequence for a number of objects (bottom graph) and their relative size with respect to the image per frame for the sequence (top graph), as can be obtained with a method according to an embodiment of the present invention.
Figure 10B:
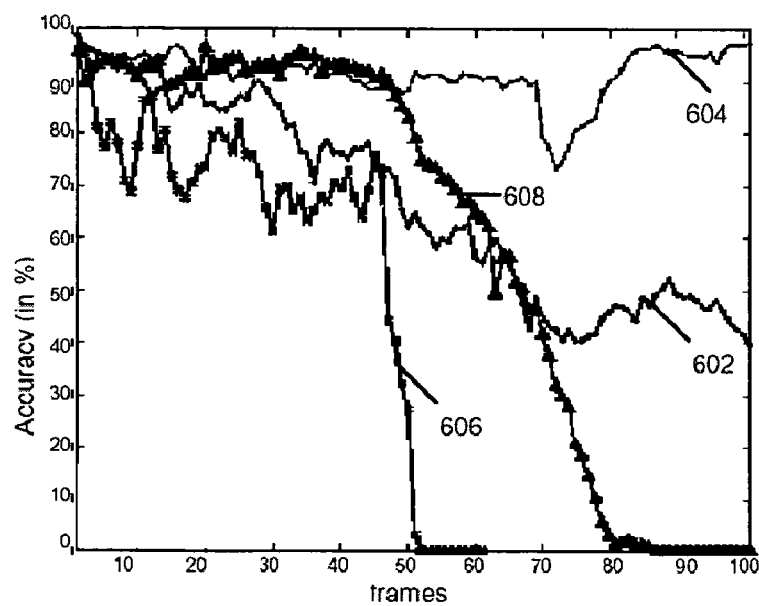
Figure 11A:
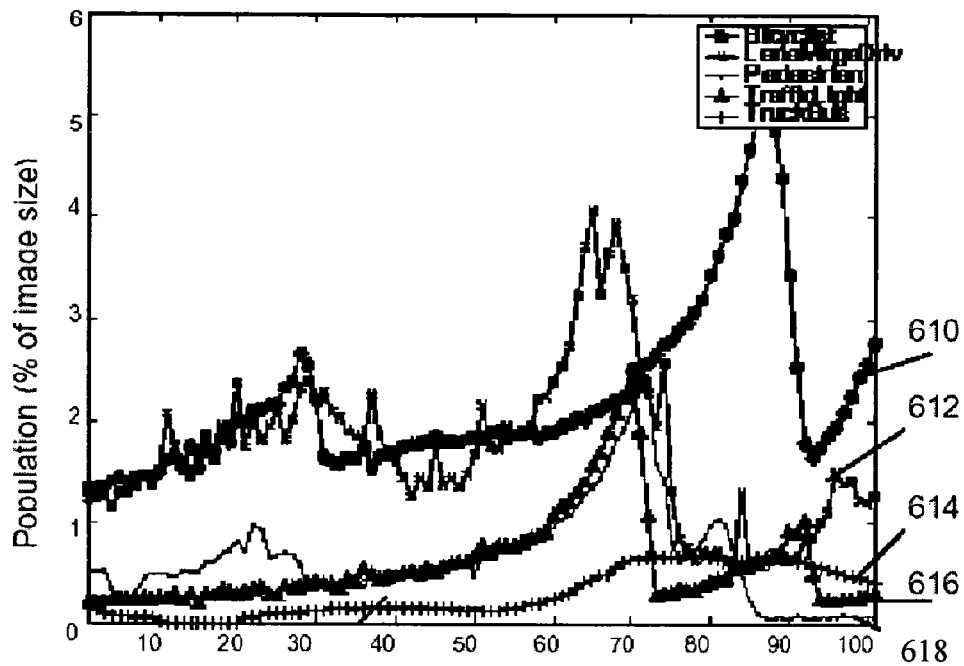
Figure 11B:
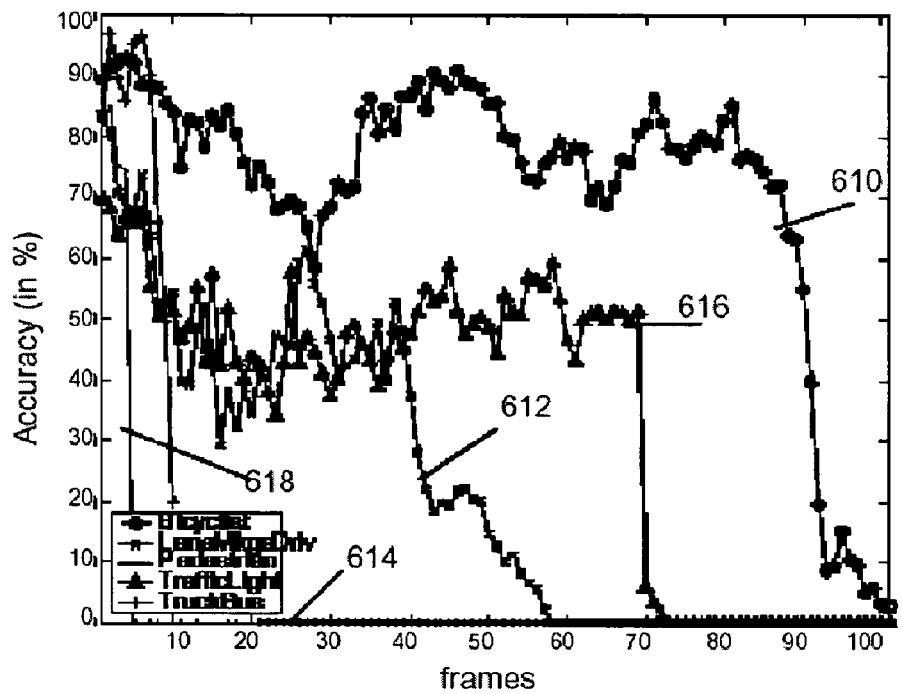

In the present example, label propagation as described with respect to FIG. 1 is used. The overall performance of the label propagation method was measured based on the confusion matrix for all object classes between the groundtruth labelled frames and each estimated labelled frame. The propagation accuracy rates were measured for the object classes normalized by the object size. In other words, this rate indicates the percentage of pixels for a given class which were correctly labelled in each frame. In FIGS. 10 and 11, the evolution of propagation accuracy is shown through frames of the most frequent classes along with their population per frame. In FIG. 10 the evolution of the propagation accuracy and of the population (in percentage of image size) as function of the frames is shown for buildings 602, roads 604, cars 606 and sidewalk 608. In FIG. 11 the evolution of the propagation accuracy and of the population (in percentage of image size) as function of the frames is shown for bicyclists 610, drive lane markation 612, a truckbus 614, traffic lights 616 and pedestrians 618. The correct propagation rates vary significantly from less than 1% to 98% across the sequence depending on the class. In particular, the highest rates are generally obtained by the largest objects such as road and building, as can be seen in FIG. 10. Cars, as indicated in FIG. 10, and bicyclists, as indicated in FIG. 11, although representing only 1% and 2% in size on average, achieve reasonably well. Those latter classes are particularly important to detect in a driving environment. In FIG. 11, the rapid dropping of the accuracy for the drivable lane markings can be observed although they are still present in the sequence. Unlike large continuous regions such as building, lane markings are composed of interrupted similar patches on the road and their track is quickly lost. The reported rates are normalized by their population.

Figure 12:
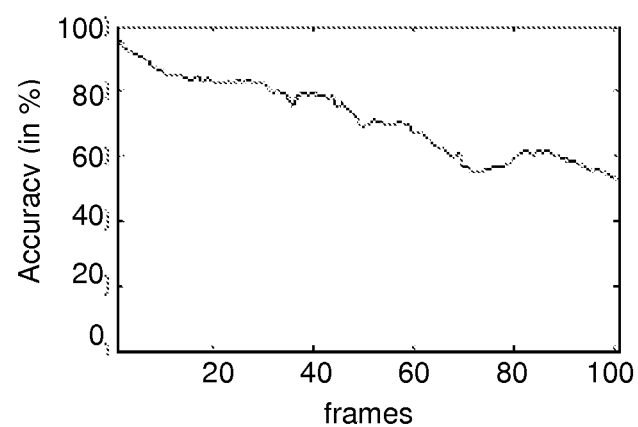
FIG. 12 is a schematic representation of the overall accuracy over all classes per frame for the sequence of video data, as can be obtained with a method according to an embodiment of the present invention.

From the human labeller point of view, the overall number of correctly classified pixels really matters, as shown in FIG. 12. It drops from 98% to 53% at the last frame. This is a good result in view of the difficulty of the sequence and the absence of user input throughout the sequence. The area below this curve can be viewed as the number of pixels the user will not have to label. The latter therefore illustrates that a considerable gain in labelling time can be obtained. The present example illustrates that the majority of the labelled pixels can be correctly propagated even after a hundred frames. The example illustrates the advantage that the performance of this automatic propagation mechanism over many frames can greatly reduce the user effort in the task of video object labelling.

It is to be understood that although preferred embodiments, specific constructions and configurations, as well as materials, have been discussed herein for devices according to the present invention, various changes or modifications in form and detail may be made without departing from the scope of this invention as defined by the appended claims. For example, whereas an application system has been described, the present invention also relates to a method for controlling an application system by processing video data according to a method for processing and deriving from the processed video data control instructions for controlling the application system.

Furthermore, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. A method for processing video data comprising a plurality of images, the method comprising:
   obtaining, for each of said plurality of images, a segmentation in a plurality of regions and a set of keypoints, a keypoint in the image comprising a pixel location and an area surrounding the pixel location having an average radius given by its scale which defines its support;
   tracking at least one region between a first image and a subsequent image of said plurality of images based on an appearance of the at least one region and a region in said subsequent image; and
   finding a matched region in the subsequent image taking into account a matching between keypoints in the first image and the subsequent image,
   wherein the tracking of two regions, one from the first image and the other from the subsequent image, are matched if the two regions have a number of matching keypoints in common which is non-zero and if overall similarity of the two regions or what the two regions have in common is larger than a predetermined value;
   associating at least one first keypoint to the at least one region in said first image when at least half of its support disk intersects with the at least one region;
   matching a subsequent keypoint in said subsequent image with said first keypoint; and
   determining a matching of the at least one region with a subsequent region in said subsequent image based on information regarding said matched keypoints.

2. The method for processing video data according to claim 1, wherein matching a subsequent keypoint with the first keypoint comprises bidirectional matching.

3. The method for processing video data according to claim 1, wherein the tracking furthermore takes into account a measure expressing how much the first region and the subsequent region are similar or have in common.

4. The method for processing video data according to claim 1, wherein the tracking furthermore takes into account groups of connected regions in the first and/or the subsequent image.

5. The method for processing video data according to claim 1, the method further comprising:
   obtaining a label for at least one object in the first image, the object comprising the at least one region or first keypoint in the first image; and
   propagating the label to the matched region in the subsequent image using the correspondence between the at least one region or first keypoint in the first image and the at least one region or subsequent keypoint in the subsequent image.

6. The method for processing video data according to claim 5, wherein propagating the label comprises:

obtaining a keypoint-label for a first keypoint in the object in the first image based on the label of said object;

associating a corresponding keypoint-label to the matching subsequent keypoint based on the keypoint-label for the first keypoint; and deriving a label for the object in the subsequent image based on the keypoint-label of the subsequent keypoint in the subsequent image.

7. The method for processing video data according to claim 5, wherein propagating the label comprises:

obtaining a region-label for a first region in the object in the first image based on the label of said object;

associating a corresponding region-label to the matching subsequent region based on the region-label for the first region; and deriving a label for the object in the subsequent image based on the region-label of the subsequent region in the subsequent image.

8. The method for processing video data according to claim 1, wherein said segmentation is an over-segmentation of the image such that at least one object corresponds to a plurality of segments.

9. A method for controlling an application system, the method comprising processing video data according to the method of claim 1; and deriving from the processed video data control instructions for controlling the application system.

10. The method for controlling according to claim 9, wherein the application system is an automotive vehicle and wherein deriving control instructions comprises deriving driving instructions.

11. A computer program product storing instructions on a non-transitory computer-readable medium, the instructions causing to perform the method according to claim 1.

12. A processing system for processing video data comprising a plurality of images, the system comprising:

a processor, the processor being configured to:

obtain, for each of said plurality of images, a segmentation in a plurality of regions and a set of keypoints, a keypoint in the image comprising a pixel location and an area surrounding the pixel location having an average radius given by its scale which defines its support;

track at least one region between a first image and a subsequent image of said plurality of images based on an appearance of the at least one region and a region in said subsequent image; and find a matched region in the subsequent image taking into account a matching between keypoints in the first image and the subsequent image, wherein the tracking of two regions, one from the first image and the other from the subsequent image, are matched if the two regions have a number of matching keypoints in common which is non-zero and if overall similarity of the two regions or what the two regions have in common is larger than a predetermined value;

associate at least one first keypoint to the at least one region in said first image when at least half of its support disk intersects with the at least one region;

match a subsequent keypoint in said subsequent image with said first keypoint; and determine a matching of the at least one region with a subsequent region in said subsequent image based on information regarding said matched keypoints.

13. A processing system according to claim 12, wherein the processor is further configured to obtain a label for at least one object in the first image, the object comprising the at least one region or first keypoint in the first image; and propagate the label to the matched region in the subsequent image using the correspondence between the at least one region or first keypoint in the first image and the at least one region or subsequent keypoint in the subsequent image.

14. An application system for performing an action, the application system comprising a processing system according to claim 12 and a second processor configured to control the action taking into account tracked region information for the video data obtainable using the processing system.

15. The application system according to claim 14 wherein the second processor is further configured to control the action taking into account propagated label information for the video data obtainable using the processing system.

16. The application system according to claim 14, wherein the application system is an automotive vehicle.

17. The application system according to claim 16, wherein the action comprises manipulating a speed or direction of the automotive vehicle.

* * * * *